Inventors
AXEL VON STARK
FRANZ PAWLEK

United States Patent Office 3,734,720
Patented May 22, 1973

---

3,734,720
METHOD OF SEPARATING SUBSTANCES FROM A MELT OF GOOD ELECTRICAL CONDUCTIVITY
Axel von Starck, Remscheid-Luttringhausen, and Franz Pawlek, Berlin, Germany, assignors to AEG-Elotherm GmbH, Remscheid-Hasten, Germany
Filed June 1, 1971, Ser. No. 148,347
Int. Cl. C22b 9/12, 7/00, 21/06
U.S. Cl. 75—93                         6 Claims

ABSTRACT OF THE DISCLOSURE

A method of separating from a melt substances having solubilities which decrease with decreasing temperature whereby the melt is conveyed by an electro-magnetic field up an ascending conveyor trough from a holding vessel and a temperature gradient generated along the trough to cause the substances to precipitate.

---

Figure 1:
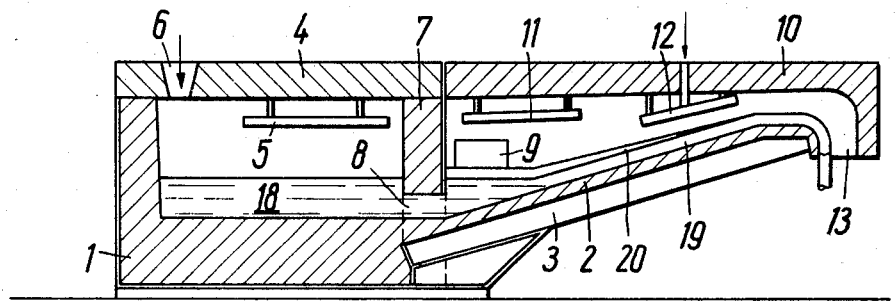

The production of non-ferrous metals nearly always involves solving the problem of removing impurities from the smelted crude metal. For example, in the production of lead, the lead ore concentrates are usually roasted in a sinter machine and the sinter thus obtained is reduced together with coke in a shaft furnace for the production of the lead bullion. This lead bullion contains copper, arsenic, antimony and tin as well as the noble metals silver and gold, as undesirable impurities. For the purpose of removing these impurities the crude lead is agitated in large iron pots at a temperature slightly above its solidification point and in course of time the copper and some of the antimony, arsenic and tin collect in the form of a black powder, known as the matte dross, floating on the surface of the liquid lead. This is removed. The provisionally refined lead is then heated in a reverberatory furnace to about 600° C. and the remaining impurities of arsenic, antimony and tin are removed by top blowing with air. For the removal of the silver zinc is first added to the molten lead and the melt is then cooled whilst being agitated. The major part of the silver alloys with the zinc which floats on the molten lead. The remainder of the silver in the zinc is removed by vacuum distillation and by a treatment with molten caustic soda.

In the majority of these procedural steps separation is discontinuous, i.e. performed in batches. In some other steps efficiency necessitates the use of large volumes of lead or a relatively large amount of power may be needed per unit of weight of fine lead obtained.

The object of the present invention is the provision of a method of separating substances from a melt of good electrical conductivity, in which the solubilities of said substances considerably diminish with decreasing temperature and separation is accomplished in continuous process.

The method according to the invention consists in driving the melt from a melting or holding vessel up an ascending refractory trough by means of a travelling electromagnetic field, and by generating along the length of the trough a controllable zone of considerably diminishing solubility of the substance that is to be separated, thus causing the substance it is desired to separate to precipitate from the melt along the length of the trough so that it can be removed.

According to another feature of the invention the temperature gradient is so calculated that the substances that are to be separated are precipitated in solid form at least in a part of the trough that adjoins the upper end of the trough.

In a modification of the proposed method the temperature gradient may be so calculated that the substances that are to be separated are precipitated in the liquid state.

According to yet another feature of the invention the substances that are precipitated in the trough are removed by returning them contrary to the conveying direction of the traveling field into the melting or holding vessel whence they can be removed.

The method according to the invention can be applied more specifically to the refining of lead bullion.

For instance, in an advantageous application of the invention to the removal of copper from lead bullion, the latter as obtained from a shaft furnace and collected in a holding vessel in the form of a melt is propelled up the ascending trough in which it is so cooled that in a zone of the trough adjoining its upper end its temperature will be only a few degrees above the solidification point of the melt, causing the copper to be precipitated as a matte dross that can be removed from the surface of the liquid lead in the trough.

In an alternative particular application in connection with the refining of lead, zinc is added at a temperature of not less than 450° C. to a provisionally refined lead in a holding vessel, the liquid lead/zinc alloy being then propelled up the trough and so cooled in the trough that in a region of the trough adjacent its upper end its temperature will be only a few degrees above the solidification point of the lead/zinc eutectic, so that part of the zinc together with the silver is precipitated and floats on the surface of the lead-zinc alloy down the trough contrary to the conveying direction of the travelling field back into the holding vessel.

The proposed method will now be more particularly and illustratively described in its application to the refining of lead, and reference will be made to the drawings.

FIG. 1 schematically shows the vessel 1 of a holding furnace in section. From this vessel a refractory trough 2 rises at an angle. For the generation of a travelling field a three-phase linear motor 3 is disposed underneath the trough and thereby turns it into an electromagnetic conveying trough. The holding vessel 1 is closed by a cover 4 which on its inside carries heating means 5 and which has a charging opening 6 for introducing the melt into the vessel.

The interior of the holding vessel 1 is separated from the interior of the trough by a parting wall 7 resembling an inverted weir so that the holding vessel 1 communicates with the interior of the trough only through a gap 8 formed between the bottom of the trough and the underside of the wall 7. At the end of the trough adjoining the holding vessel an opening 9 is provided in a side wall of the trough, which—as will yet be described—serves for the removal of the precipitated matte dross. The trough 2 is closed by a cover 10 which on its inside near the holding vessel carries a heating element 11 and near the upper end of the trough a cooling element 12. The upper end of the trough merges into a pouring spout 13.

Figure 2:
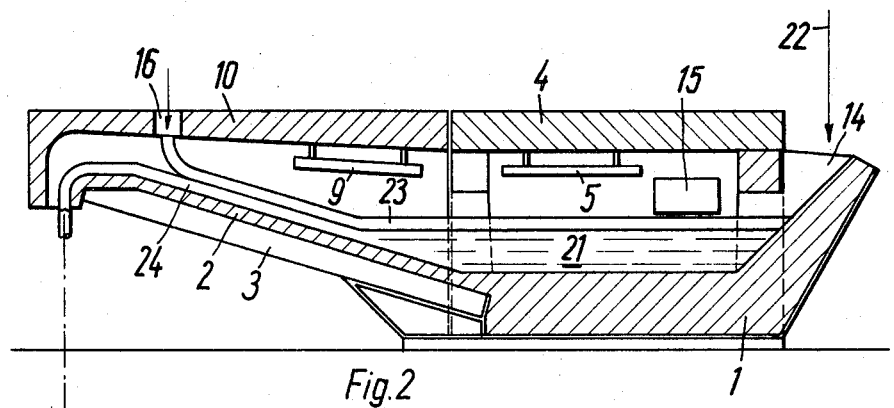

FIG. 2 shows a holding vessel associated with an electromagnetic conveying trough according to FIG. 1. Corresponding parts are identified by the same reference numbers as in FIG. 1. In the arrangement according to FIG. 2 the parting wall forming an inverted weir between the interior of the holding vessel and the trough is absent. The arrangement further differs from that in FIG. 1 in that the feed opening 14 for the melt is located at the end of the holding vessel remote from the trough and that the slag overflow opening 15 is provided in a side wall of the holding vessel parallel to the plane of the paper. Moreover, the cover 10 of the trough is not equipped with cooling means, its place being taken by an opening 16 through which substances can be introduced.

Figure 3:
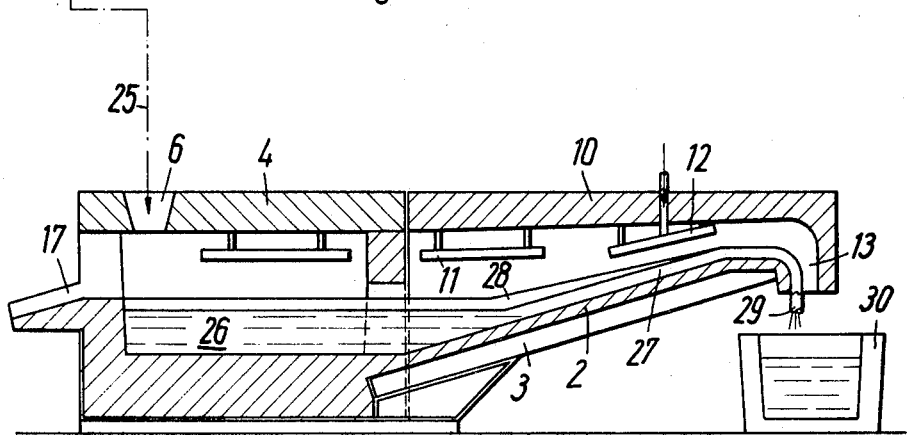

The arrangement in FIG. 3 differs from that in FIG. 1 in that the parting wall forming an inverted weir between the vessel and the trough is again absent and that there is also no opening in the side wall of the trough. On the other hand, the holding vessel is provided with an overflow 17 in the side remote from the trough.

By reference to these three arrangements the refining of lead bullion in continuous process will be described.

The molten lead 18 produced in the shaft furnace enters the holding vessel 1 (FIG. 1) through the filling opening 6 and its surface extends through the gap 8 below the underside of the parting wall 7 into the lower end of the trough 2. The three-phase linear motor which is connected to a source of three-phase supply, not shown in the drawing, generates an electromagnetic travelling field inside the trough and this drives the melt from the holding vessel 1 up the ascending trough 2. The depth of the layer 14 of liquid metal travelling up the trough and hence the conveying rate can be controlled by the strength of the travelling field. By controlling the heating and cooling effects of the heating element 9 and the cooling element 10 the temperature drop in the melt along the length of the trough is so regulated that—in view of the decrease in solubility of copper in lead as the temperature drops—the copper will be precipitated and float on the lead surface. The precipitation of the copper is particularly promoted by the considerable amount of thermal convection by the layer of lead 19. The temperature drop is so calculated that at least in a zone of the trough adjoining the upper end of the trough the temperature will be so low that the copper precipitates in the form of a matte dross. The travelling field cannot induce significant currents in the dross—even when this forms a layer—because of its pulverulent state. Consequently the driving power of the travelling field on the matte dross is not sufficient to drive it out of the end of the trough together with the molten lead.

The precipitated dross 20 therefore floats down the surface of the lead 19 contrary to the conveying direction of the travelling field, and is retained by the face of the parting wall 7 so that it can flow out through the opening 9 in the side wall of the trough.

The crude lead 21 that flows out through the pouring spout 13 and that has been freed of its copper and a small proportion of the arsenic, antimony and tin it contains is then introduced—as indicated by the arrow 22—into the holding vessel of the arrangement illustrated in FIG. 2 through the feed opening 14. In this arrangement the lead is driven from the holding vessel up the ascending trough 2 by the action of the travelling field in the same way as in FIG. 1, and leaves the trough 2 by flowing out through the spout 13. Through the opening 16 in the cover of the trough a slagging agent 23 consisting of a mixture of caustic soda and saltpetre is added. This floats on the surface of the layer of lead 24 and descends contrary to the conveying direction of the travelling field back into the holding vessel where the slag can be skimmed through the slag overflow opening.

The lead that has thus been provisionally refined and that leaves the pouring spout of the arrangement in FIG. 2 is now transferred—as indicated by the line 25—to the holding vessel 1 of the arrangement in FIG. 3 which it enters through the opening 6 in the cover. Zinc in solid form is now added through the opening 14 to the molten lead 26 which is kept in the holding vessel (FIG. 3) at a temperature of at least 450° C. The resultant mixture of molten lead and zinc is propelled up the ascending trough by the action of the travelling field. By controlling the depth of the rising melt by regulation of the strength of the travelling field and by varying the heating and cooling effects of the heating element 9 and the cooling element 10, the temperature drop in the melt along the length of the trough is so adjusted that—in view of the diminishing solubility of the zinc in the lead at falling temperature and promoted by the strong thermal convection in the propelled layer 27—the zinc will precipitate together with the silver contained in the lead as an impurity and collect on the surface of the lead. The temperature drop is so calculated that the temperature of the lead/zinc melt in a region adjacent the upper end of the trough will be only a few degrees above the solidification point of the lead-zinc eutectic so that the zinc in this region will precipitate in the form of a powder. The effect of the travelling field on this pulverulent precipitate is too low to continue driving it upwards together with the lead. Consequently the precipitated lead/silver alloy 28 will float back into the holding vessel down the trough, contrary to the conveying direction of the travelling field, whereas the lead 29 from which the silver has been abstracted flows over the pouring spout 13 (FIG. 3) for instance into a ladle 30. The remainder of the zinc may then be removed from this part of the lead in conventional manner, for instance by vacuum distillation.

What is claimed is:

1. A method of separating substances having solubilities which decrease with decreasing temperature from a melt having a good electrical conductivity, comprising conveying the melt as a layer from a vessel up an ascending refractory trough by an electromagnetic travelling field and generating a controllable temperature gradient so that the solubilities of the substances that are to be separated diminish considerably along the length of the trough, thereby inducing the substances that are to be separated to precipitate along the length of the trough on the upper surface of the melt layer 2 so that they can be removed.

2. A method according to claim 1, wherein the temperature gradient is so calculated that the substances that are to be separated precipitate in solid form at least within a region of the trough adjoining the upper end of the trough.

3. A method according to claim 1, wherein the temperature gradient is so calculated that the substances that are to be separated precipitate in the liquid state.

4. A method according to claim 1, wherein the substances precipitated in the trough are returned contrary to the conveying direction of the travelling field into the melting or holding vessel and including the step of removing the substances from the vessel.

5. A method according to claim 1 for the continuous removal of copper from lead bullion, including the step of introducing the molten crude lead from a shaft furnace into the holding vessel and cooling the melt as it is conveyed up said trough so that its temperature in a region adjoining the upper end of the trough is only a few degrees above the solidification point of the melt, so that the copper is precipitated in the form of a matte dross and withdrawing the matte dross from the surface of the liquid layer of lead in the trough.

6. A method according to claim 1 for the continuous desilvering of provisionally refined lead, including the step of adding zinc to a melt of provisionally refined lead in the holding vessel (1) at a temperature of at least 450° C., and cooling the melt as it is conveyed up the trough so that its temperature in a region of the trough adjacent its upper end is only a few degrees above the solidification point of the lead/zinc eutectic so that a part of the zinc together with the silver is precipitated and floats back on the surface of the lead/zinc alloy into the holding vessel contrary to the conveying direction of the travelling field.

References Cited

UNITED STATES PATENTS

| | | | |
|---|---|---|---|
| 3,136,627 | 6/1964 | Caldwell | 75—68 |
| 3,610,600 | 10/1971 | Schnake | 75—49 |
| 2,969,970 | 1/1961 | Schomer | 75—93 R |
| 3,127,336 | 3/1964 | Chema | 204—180 |
| 3,616,456 | 10/1971 | Valmet | 204—180 |
| 3,398,076 | 8/1968 | Suleski | 204—180 |
| 2,468,660 | 4/1949 | Gjedebo | 75—63 |

L. DEWAYNE RUTLEDGE, Primary Examiner

P. D. ROSENBERG, Assistant Examiner

U.S. Cl. X.R.

75—63, 68

UNITED STATES PATENT OFFICE
CERTIFICATE OF CORRECTION

Patent No. 3,734,720      Dated May 22, 1973

Inventor(s) Axel von Starck, Remscheid-Luttringhausen, and Franz Pawlek

It is certified that error appears in the above-identified patent and that said Letters Patent are hereby corrected as shown below:

In the heading, after "Filed June 1, 1971, Ser. No. 148,347" insert --Claims priority, application German, June 5, 1970, P 20 27 636.2--.

Signed and sealed this 1st day of January 1974.

(SEAL)
Attest:

EDWARD M. FLETCHER, JR.
Attesting Officer

RENE D. TEGTMEYER
Acting Commissioner of Patents